US006578198B2

(12) United States Patent
Freeman et al.

(10) Patent No.: US 6,578,198 B2
(45) Date of Patent: *Jun. 10, 2003

(54) PERSONAL COMPUTER UPGRADE

(75) Inventors: Lawrence Alexander Freeman, Fremont, CA (US); Roel Foppema, Menlo Park, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/970,819

(22) Filed: Oct. 3, 2001

(65) Prior Publication Data

US 2002/0092009 A1 Jul. 11, 2002

Related U.S. Application Data

(63) Continuation-in-part of application No. 09/133,622, filed on Aug. 13, 1998, now Pat. No. 6,314,459.

(51) Int. Cl.[7] .................................................. G06F 9/54
(52) U.S. Cl. ....................................... 717/168; 709/220
(58) Field of Search ................................ 709/310–320, 709/220; 717/168–178

(56) References Cited

U.S. PATENT DOCUMENTS

| 5,867,665 A | * | 2/1999 | Butman et al. | 709/239 |
|---|---|---|---|---|
| 5,867,667 A | * | 2/1999 | Butman et al. | 709/249 |
| 5,884,035 A | * | 3/1999 | Butman et al. | 709/128 |
| 6,026,430 A | * | 2/2000 | Butman et al. | 709/203 |
| 6,032,208 A | * | 2/2000 | Nixon et al. | 710/64 |
| 6,098,116 A | * | 8/2000 | Nixon et al. | 710/8 |
| 6,327,617 B1 | * | 12/2001 | Fawcett | 709/219 |
| 6,457,175 B1 | * | 9/2002 | Lerche | 717/173 |
| 6,467,088 B1 | * | 10/2002 | AlSafadi et al. | 717/173 |

OTHER PUBLICATIONS

Interactive Week, Jul. 20, 1998, "Sun Calls On Jini To Simplify Network Use".*
PC Magazine Online, Jul. 21, 1998, "Dreaming of Jini".*
EP 0816969A Sun Microsystems Inc. Jan. 7, 1998. 4 line 8–18, col. 11 line 45, col. 12 line 9—figure 1, col. 20 line 25–37, col. 22 line 18–32,col. 24 line 53, col. 26. line 17.*
IBM: "Distributed SOM (DSOM)" SOM Objects Developer Toolkit Users p. 1–1V, 601–690 XP002047926 Guide XX,XX.*

* cited by examiner

Primary Examiner—St. John Courtenay, III
(74) Attorney, Agent, or Firm—Michael Schmitt (57) ABSTRACT

A method for networking processing sub-systems is provided in the present disclosure. The method enables sharing of a resource between a plurality of information processing sub-systems wherein at least one sub-system is a PC and at least one sub-system is an upgrade. The method enables the PC to be informed about access to an upgrade. The method enables the upgrade to broadcast a message with an IP address and a port number. The method enables the PC to set up, in response to the message, a proxy client for communicating with a port of the upgrade indicated by the port number. The method enables the upgrade to set up a proxy server to handle a request from the proxy client for access to a second resource. The method further enables registering with the PC of a second interface to the second resource for access to the second resource from the PC.

18 Claims, 10 Drawing Sheets

PERSONAL COMPUTER UPGRADE

CROSS-REFERENCE TO RELATED APPLICATIONS

The present patent application is a continuation-in-part of U.S. Ser. No. 09/133,622, now U.S. Pat. No. 6,314,459, filed Aug. 13, 1998, which is incorporated herein by reference in its entirety.

BACKGROUND OF THE INVENTION

1. Field of the Invention

The invention relates to an apparatus and a method for networking processing sub-systems and more particularly to a method of upgrading existing computers via external connections.

2. Description of Related Art

Upgrading a personal computer (hereinafter PC) may require changing the motherboard and central processing unit (hereinafter CPU). These elements are typically located within the computer, therefore upgrading one or more of these elements can be difficult. As CPU's and motherboards become outdated, consumers are often faced with a decision; either replace the PC or install an upgrade. Upgrading a PC is often the most cost effective option, however it can be difficult. Even installing external components, thereby avoiding the internal workings of a PC, can require a difficult configuration process.

A known technology of networking devices is Jini™ of Sun Microsystems. Jini™ is a java-based software technology that assists in networking PC's and peripherals. When plugged into a network, a Jini-enabled device will broadcast its presence. Network clients that are ready to use that device can request the necessary software from the device, bypassing a server or a network administrator. This architecture builds on top of an existing network. A disadvantage of this technology is that the network is assumed to have been configured in advance.

To enable autoconfiguration of shared resources and shared services in a network of processor sub-systems requires that the following problems be solved: detection of a new network connection; assignment of a network address without user intervention; and an implementation of a resource and service sharing protocol.

The first problem relating to the detection of a new device has been solved by plug-and-play technology. For example, the Linux operating system (OS) allows many Ethernet cards/token ring cards to work automatically upon insertion into the system. The second problem relating to address assignment is currently being worked on in the industry. A known solution is a configuration management protocol, an example of which is the Dynamic Host Configuration Protocol (DHCP) that lets network administrators centrally manage and automate the assignment of Internet Protocol (IP) addresses in an organization's network.

Therefore, a need exists for a method of implementing a sharing protocol in a network of processor sub-systems.

SUMMARY OF THE INVENTION

The inventor suggests that to enable the user to upgrade a PC, a method of reshaping the PC and providing connectors so that an upgrade box can be connected externally to the PC should be advanced. In this way, an existing CPU, hard-drive (hereinafter HD), etc., may be updated easily. The upgrade may interface seamlessly with the PC. To the user the PC may function as if a new device has been installed. For example, a HD upgrade has been installed, the PC may automatically configure to accept the HD upgrade. The HD upgrade may perform functions in the place of the old HD. In reality proxies for new applications are installed on the PC while the programs are installed on the HD upgrade according to the direction of the installation software. This method works on an existing distributed display platform such as X Windows. The seamless integration may use methods of the display server.

The present disclosure is directed to an information processing system having a personal computer (PC) coupled to an upgrade. The PC may have a first proxy client registered with a first registry. The PC may further have a broadcast listener for receiving messages sent by a second broadcaster and for creating the first proxy client. The first proxy client establishes a connection with a second port listener on the upgrade on a second established channel. The PC may also have the first registry for registering a first resource local to the PC. The PC may have a first proxy server for communicating with a second proxy client and accessing the first resource. The PC may also comprise a broadcast module for broadcasting a message, and a broadcast listener for receiving a response from the upgrade issued upon receipt of the message, and for creating the first proxy client to access the second resource local to the upgrade. The PC may have a port listener for, in response to receiving a further message from the upgrade, creating a first proxy server for enabling the upgrade to access a first resource local to the PC.

The upgrade may have a second registry for registering a second resource local to the upgrade, and a second proxy server for communicating with the first proxy client and for accessing the second resource to provide an upgrade to components of the PC. The upgrade may further have a second broadcaster for communicating a network address for the upgrade and a port number on a second established channel, and a second port listener for creating the second proxy server. The upgrade may also have the second proxy client, registered with the second registry, for communicating with the first proxy server. The second resource may be a software component, a hardware component, or a software component embodied in a hardware component. The upgrade may have a broadcast module for broadcasting a message, and a broadcast listener for receiving a response from the PC issues upon receipt of the message, and for creating a second proxy client to access a first resource local to the PC. The upgrade may also comprise a port listener for, in response to receiving a further message from the PC, creating the second proxy server for enabling the PC to access the second resource local to the upgrade. The upgrade may be external to the PC.

The present disclosure is also directed at a method for modifying a PC. The method may provide an upgrade capable of broadcasting a message with an internal protocol (IP) address and a port number representing the upgrade. The method may create a proxy client on the PC to set up, in response to the message, communications with a port of the upgrade indicated by the port number. The method may create a proxy server on the upgrade, to handle a request from the proxy client for access to a second resource. The method may also register a second interface to the second resource, with the PC, for access to the second resource from the PC.

The method may provide the PC capable of broadcasting a further message with a further IP address and a further port number representing the PC. The method may create a further proxy client on the upgrade to set up, in response to the further message, communications with a further port of the PC indicated by the further port number. The method may create a second proxy server on the PC, to handle a second request from the second proxy client for access to a first resource. The method may register a first interface to the first resource, with the upgrade, for access to the first resource from the upgrade. The upgrade may be external to the PC. The second resource may be a software component, a hardware component, or a software component embodied in a hardware component.

An alternative method according to the disclosure may include enabling a personal computer (PC) to address a resource registered with an upgrade. The alternative method may create first proxy client at the PC for communication with the upgrade, the first proxy client being representative of the resource registered with the upgrade. The method may register the first proxy client as a first local resource with a registry of the PC. The method may also create a second proxy server at the upgrade for handling a request from the first proxy client. The upgrade may address a resource registered with the PC. This may be accomplished by creating a second proxy client at the upgrade for communication with the PC, the second proxy client being representative of the resource registered with the PC, registering the second proxy client as a second local resource with a registry of the upgrade, and creating a first proxy server at the PC for handling a request from the second proxy client. The upgrade may be external to the PC. The second resource may be a software component, a hardware component, or a software component embodied in a hardware component.

These and other objects, features, and advantages of the present invention will become apparent from the following detailed description of illustrative embodiments thereof, which is to be used in connection with the accompanying drawings.

BRIEF DESCRIPTION OF THE DRAWINGS

The preferred embodiments are described with reference to the drawings wherein.

Throughout the figures, same reference numerals indicate similar or corresponding features.

DETAIL DESCRIPTION OF PREFERRED EMBODIMENT

A preferred embodiment of the present invention will be described below in more detail with reference to the accompanying drawings.

Figure 1:
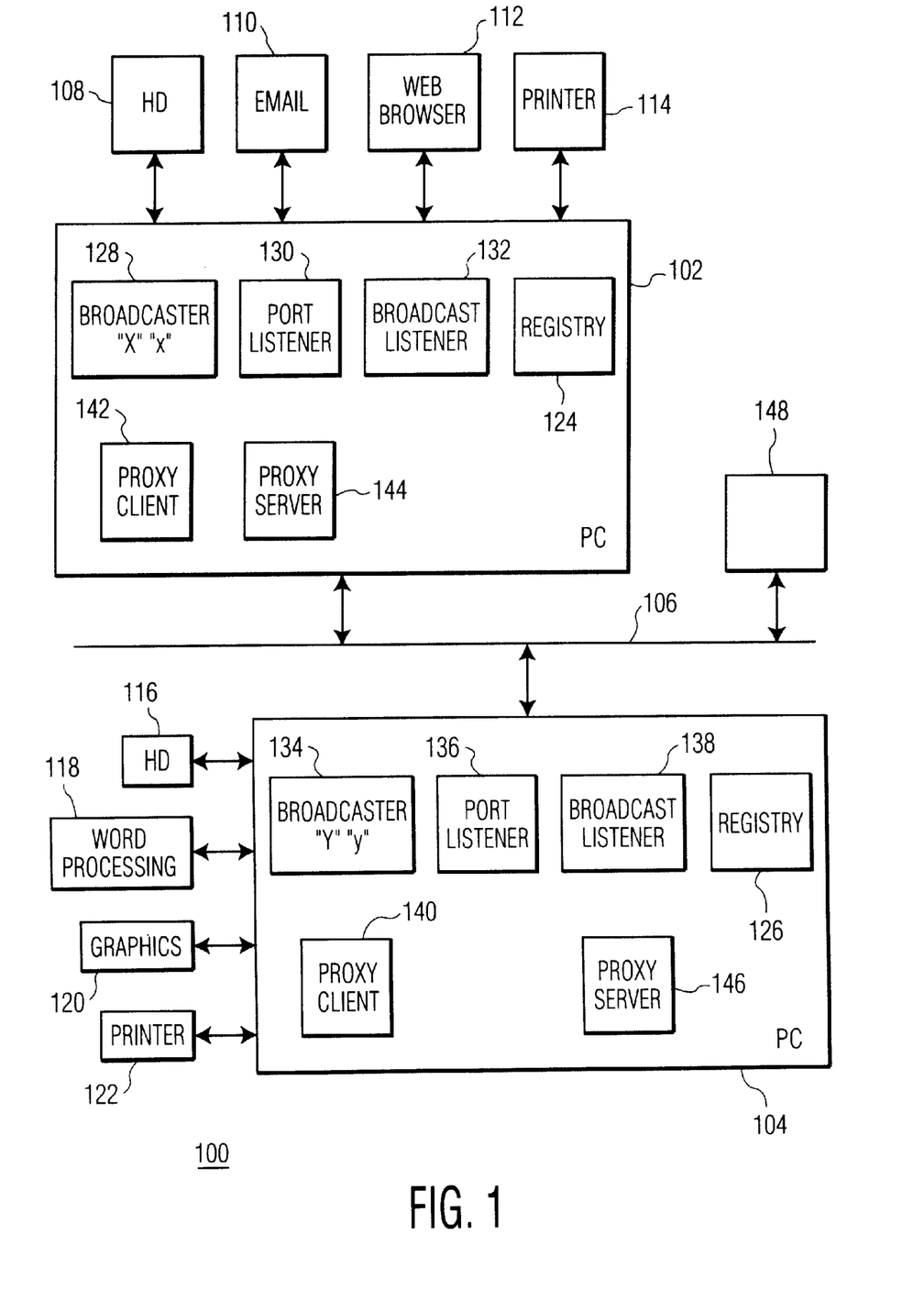
FIG. 1 is a diagram of the configuration of a system of the invention.

FIG. 1 is a block diagram with the main components of an operational system 100 in the invention. System 100 comprises a first PC 102 and a second PC 104 coupled via a bus 106. Bus 106 may be a wired bus or a wireless bus or a combination thereof. PC 102 has resources and provides services. For example, PC 102 has a hard drive 108, an email capacity 110, a web browser 112, a printer 114, etc.

Similarly, PC 104 has resources and services, such as a hard drive 116, a word processing service 118, a graphics program 120, a printer 122, etc. The terms "resource" and "service" are used interchangeably below.

PC 102 has a registry 124 for registering interfaces to resources and services 108–114 local to PC 102. Applications running on PC 102 can get access to these interfaces. The interfaces handle the messages or requests to local resources or services 108–114. Similarly, PC 104 has a registry 126 for registering interfaces to resources and services 116–122 local to PC 104.

PC 102 further comprises the following entities that are concurrent and may be threads for processes: a broadcaster 128, a port listener 130 and a broadcast listener 132. Similarly, PC 104 has a broadcaster 134, a port listener 136, and a broadcast listener 138. PC 102 further comprises a proxy client 142 and a proxy server 144. PC 104 has a proxy client 140 and a proxy server 146. Proxy client 142 communicates with proxy server 146, and proxy client 140 communicates with proxy server 144. The roles played by components 124–138 in the autoconfiguration of system 100, and the roles of proxy servers 146 and 144 and proxy clients 142 and 140 are explained with reference to FIGS. 2–7.

Figure 2:
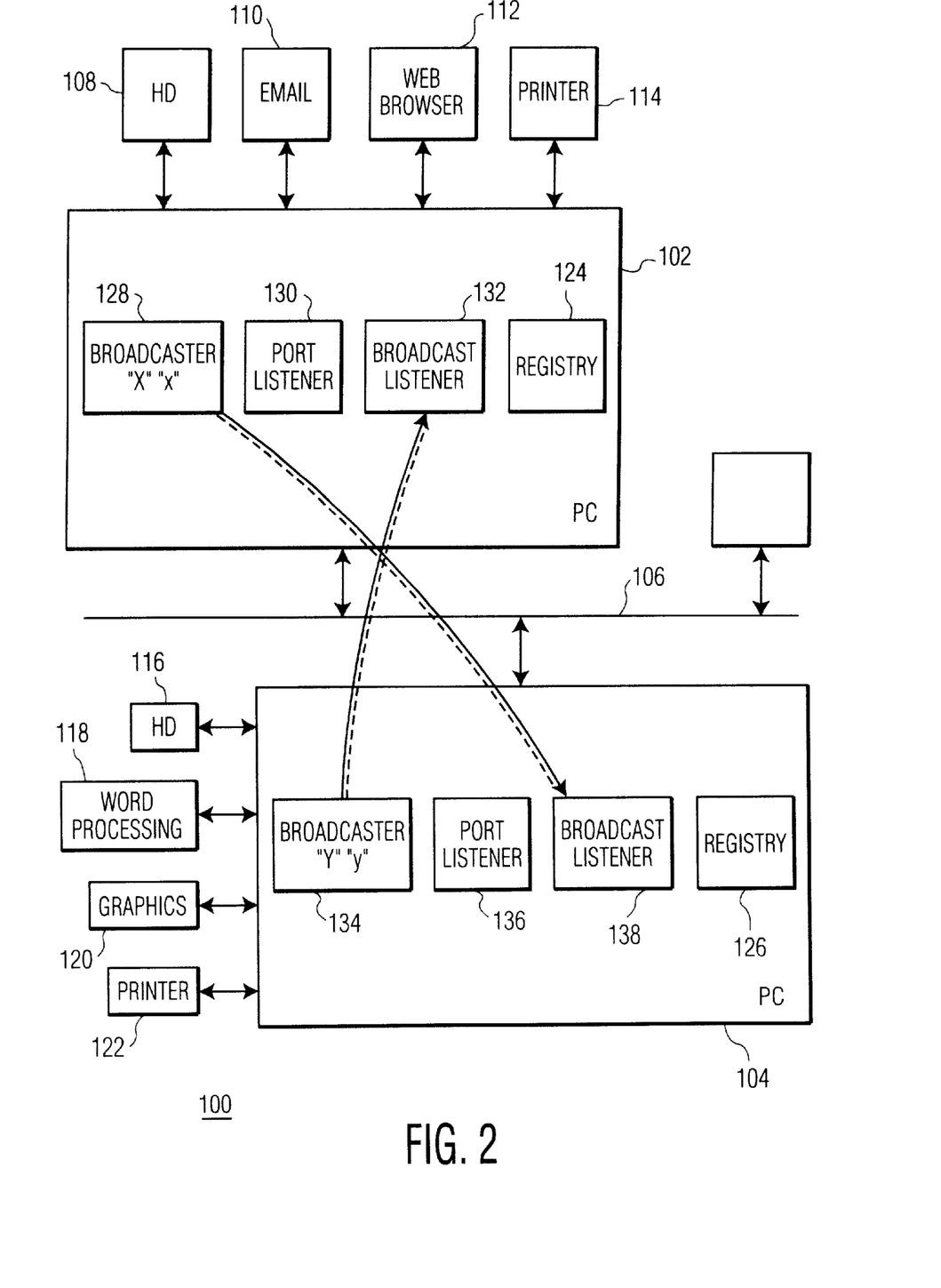
FIGS. 2–7 are diagrams illustrating various steps in the autoconfiguration process and during operational use.

FIG. 2 is a diagram of the initial configuration of system 100 when PC's 102 and 104 have been functionally connected to bus 106. In this configuration, broadcasters 128 send out on bus 106 a network address for PC 102, say "X," and a port number, say "x," on an established channel. Similarly, broadcaster 134 sends out a broadcast on bus 106 with a network address for PC 104, "Y," and a port number "y" on another established channel. Broadcast listener 138 of PC 104 receives the message broadcasted by PC 102. Broadcast listener 132 of PC 102 receives the message broadcasted by PC 104.

Figure 3:
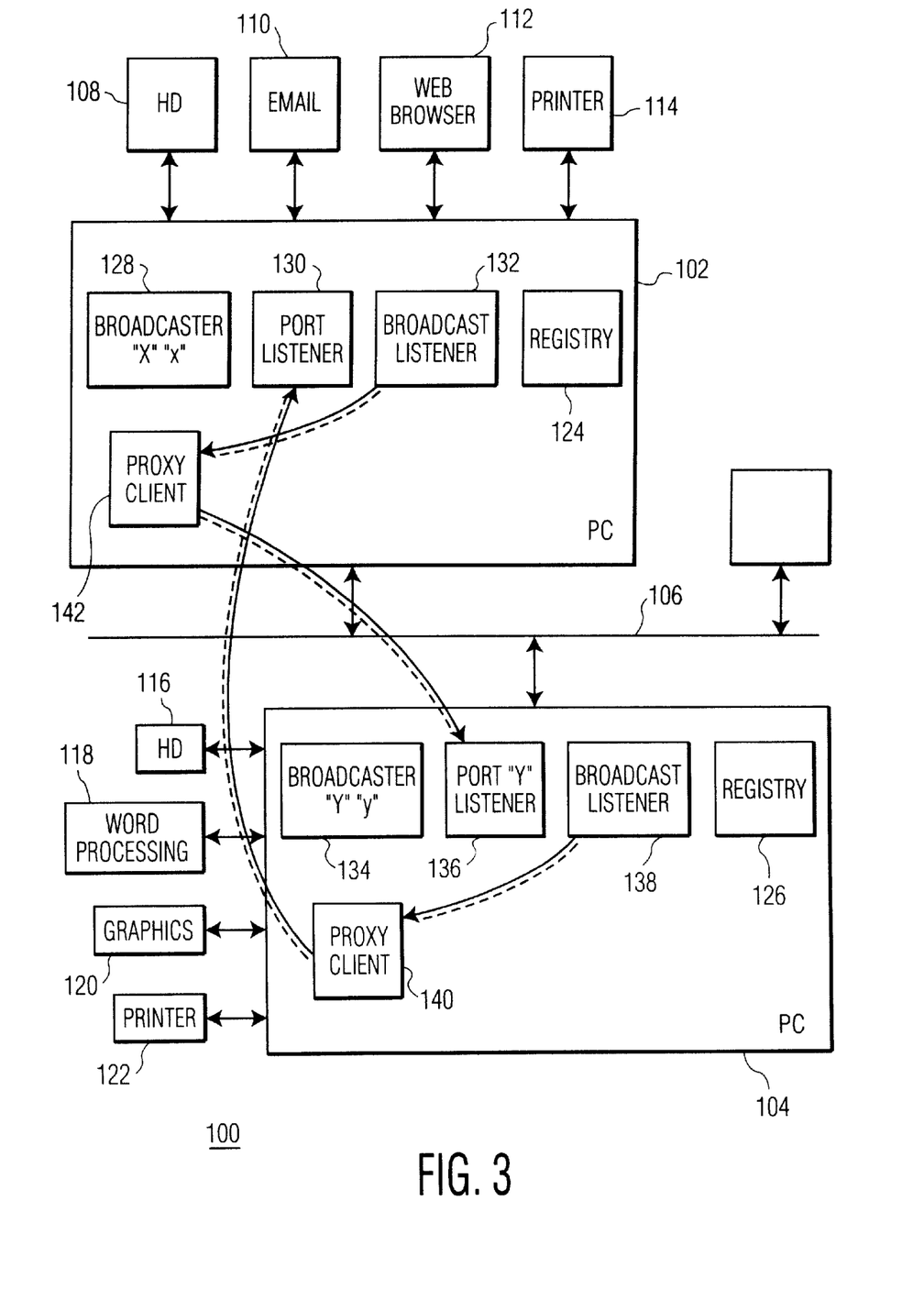

FIG. 3 illustrates a next step of the autoconfiguration process. Having received the broadcast message from PC 104, broadcast listener 132 of PC 102 generates a proxy client 142. Proxy client 142 thereupon establishes a connection with port listener 136 of PC 104 at port "y." Similarly, broadcast listener 138 of PC 104 generates proxy client 140 that establishes a connection with port listener 130 at port "x."

Figure 4:
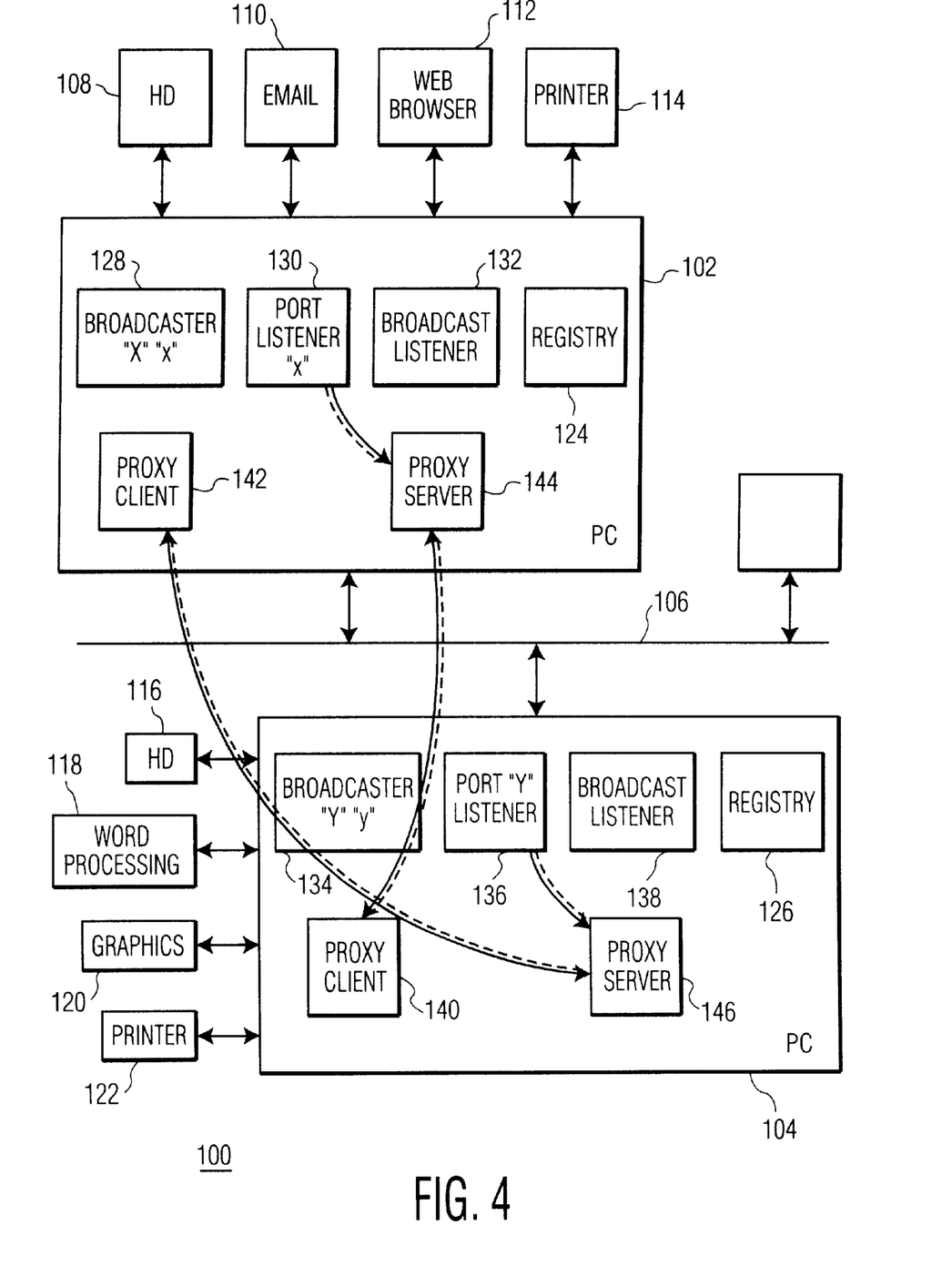

FIG. 4 shows a further step in the autoconfiguration process. Port listener 130 starts up a proxy server 144 to handle requests from remote client 140. Proxy server 144 sends information about resources 108–114, e.g., as contained in registry 124, to proxy client 140. Proxy client 140 registers this information with registry 126. Similarly, port listener 136 starts up a proxy server 146 to handle requests from remote client 142. Proxy server 146 sends information about resources 116–122 to proxy client 142, which thereupon registers this with registry 124.

Figure 5:
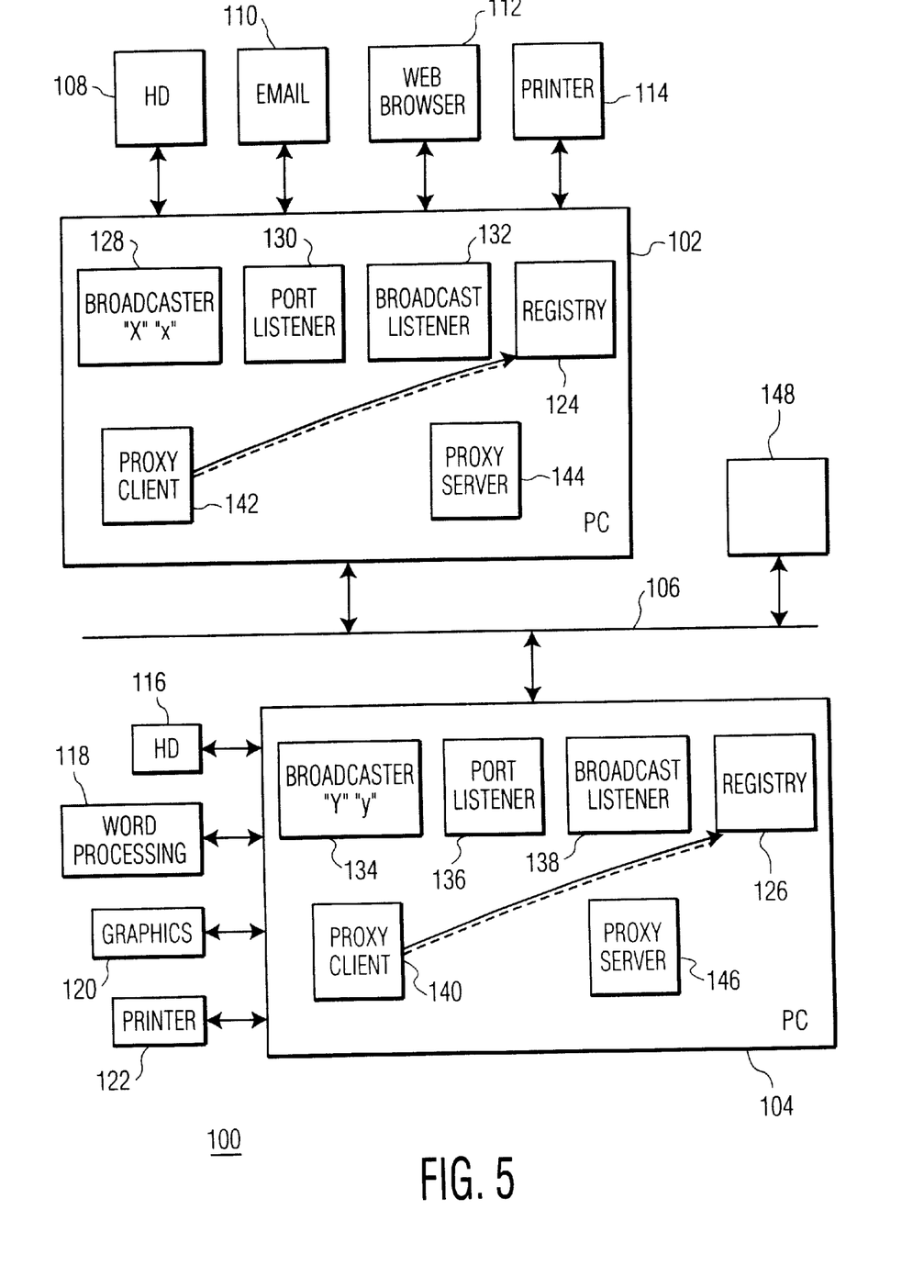

FIG. 5 shows the step wherein proxy client 142 registers with registry 124 as a local service for each resource or service available in registry 126, and wherein proxy client 140 registers with registry 126 for each resource or service available in registry 124. The result is that PC 102 has now copied its registry 124 specifying the addresses of its local resources and services to PC 104, where the copy is added to registry 126. Similarly, PC 104 has copied its registry 126 to PC 102 where it gets added to registry 124. Both PC's 102 and 104 have now been registered with each other. When a third PC 148 is connected to bus 106, a process similar as the one discussed above occurs automatically. Registries 124 and 126 thus hide the idea of whether a resource or a service is local or is residing at another apparatus. Each of the addresses in registry 124 is unique throughout registry 124. Similarly, each of the addresses in registry 126 is unique throughout registry 126. A user working at PC 102 and requesting a local resource or service, i.e., one of resources or services 108–114 has the request passed on directly to the resource or service requested indicated by the corresponding address in registry 124. When the user requests a remote service or remote resource, i.e., one of resources or services 116–122 that is local to remote PC 104, the request is forwarded to proxy client 142 and processed by proxy server 146 as discussed below with reference to FIG. 7.

Figure 6:
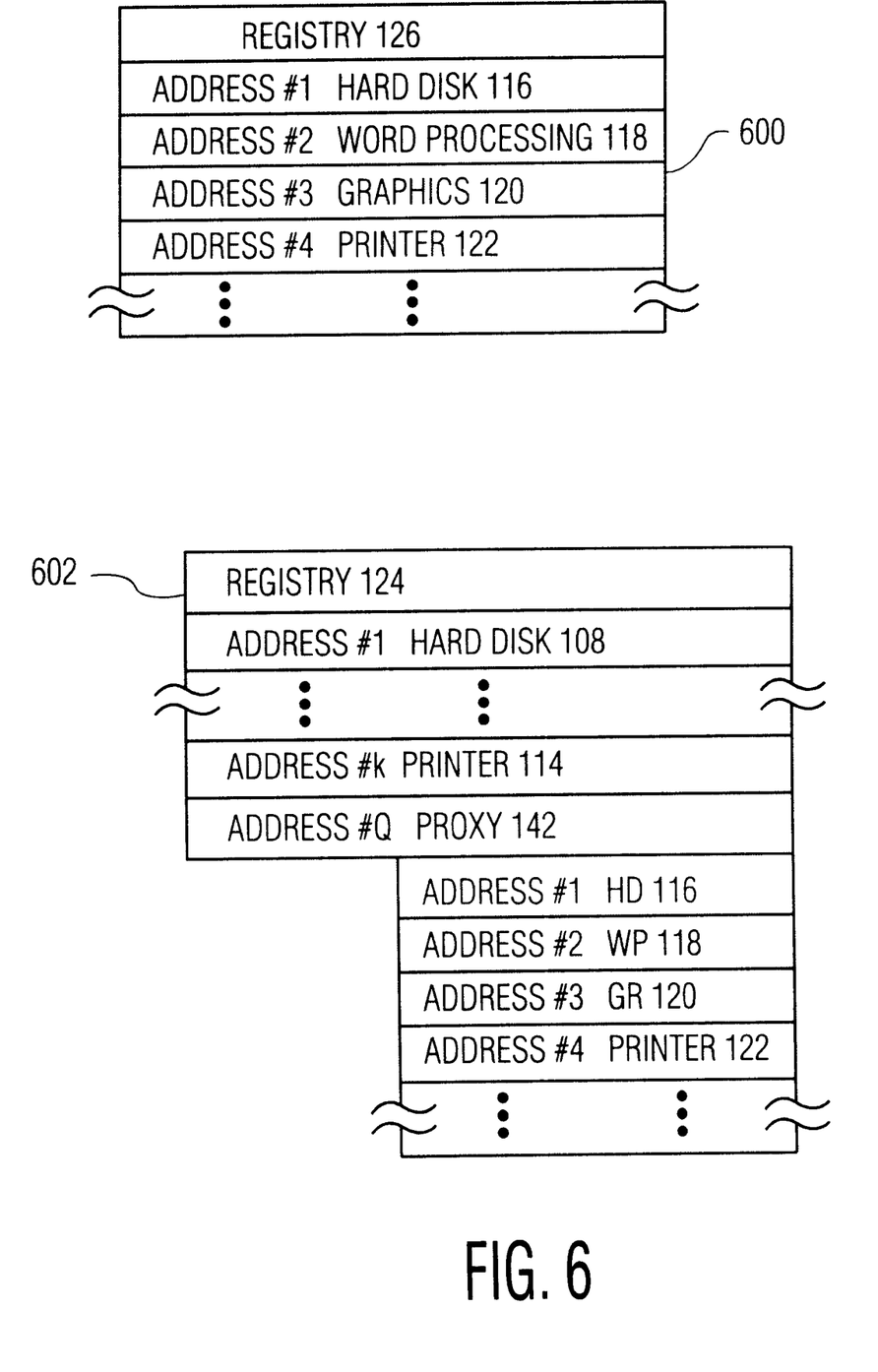

FIG. 6 gives diagrams 600 and 602 as an example of the registering of proxy client 142 with registry 124. Diagram 600 represents initial registry 126 with a list of local resources and services available at PC 104 and their respective local addresses. Diagram 602 represents registry 124 after client 142 has registered with it. Registry 124 initially comprises the list of resources and services 108–114 with local addresses #1 to #K. After client 142 has registered, registry 124 has an entry for PC 104 as proxy device at address #Q. Remote resources and services 116–122 now have addresses dependent on address #Q.

Figure 7:
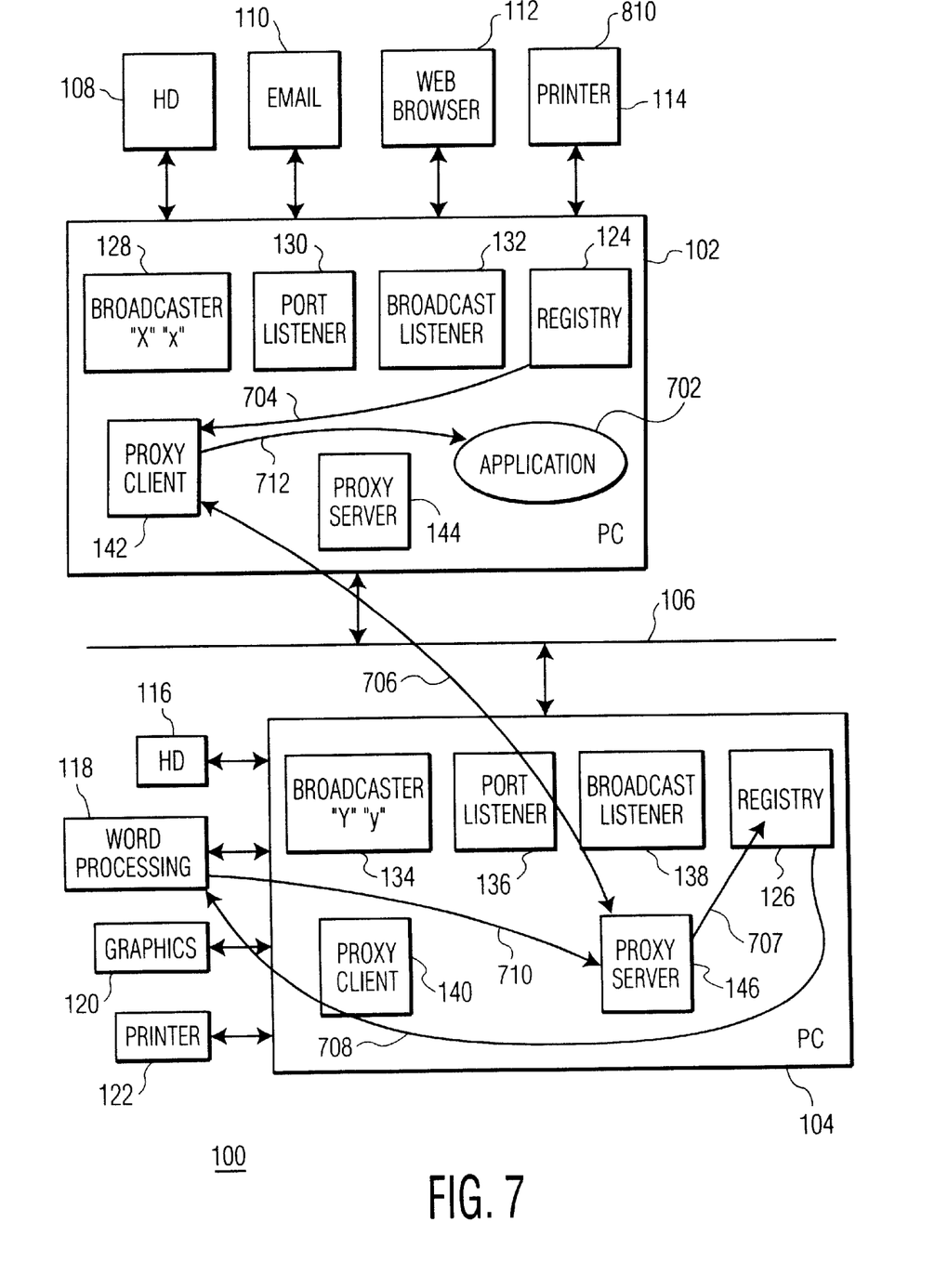

FIG. 7 illustrates this address-based operation involving proxy client 142 and proxy server 146. A software application 702 running on PC 102 generates a request for resource 118 at remote PC 104. A reference to resource 118 has been added to registry 124 as discussed above. Registry 124 is accessed by application 702, for example, the application 702 requests a resource 118, word processing. The reference has a pointer (arrow 704) to proxy client 142. Proxy client 142 on PC 102 contacts (arrow 706) proxy server 146 on remote PC 104. Proxy server 146 has an address, or handle, (arrow 708) to resource 118 via (arrow 707) local registry 126. Results of the processing by resource 118 are routed back (arrow 710) to proxy server 146 and then to the proxy client 142 (arrow 706) of application 702. The application receives the results from proxy client 142 (arrow 712). Proxy client 142 and proxy server 146 serve as a pipe.

If a request or message generated at PC 102 has an address for one of local resources or services 108–114, the message gets passed on directly to the service or device driver (not shown) of the relevant resource. In case the address is not local, e.g., refers to resource 118 at PC 104, the message is sent (arrow 704) to proxy client 142, which in turn passes on (arrow 706) the request to proxy server 146 at the dedicated port. Proxy server 146 processes the request and routes it (arrow 708) to the relevant one of resources 116–122 via (arrow 707) registry 126. The result of the request being passed to the proxy server 146 (arrow 710) and then communicated (arrow 706) from proxy server 146 to proxy client 142 from which the result is routed to, e.g., a local application at PC 102 or a display driver (not shown) local to PC 102.

If the connection between the two PC's breaks, the address of remote clients 142 and 140 can be removed from local registries 124 and 126, respectively.

The means for establishing the autoconfiguration as described above; broadcaster, port listener, broadcast listener, registry, proxy client and proxy server are installed on, initially, stand-alone PC's 102 and 104, e.g., as part of their operating systems or as applications that run on top of the operating system. The autoconfiguration means gets used when stand-alone PC 102 or 104 is connected to a network or when stand-alone PC's 102 and 104 are connected together. The software is provided to users, for example, as a program on a diskette or is made downloadable form the web.

An implementation of this autoconfiguration system can be demonstrated using a java-based system. In this scenario, two stand-alone PC's have java, a network card, and a TCP/IP stack installed on their machines. For purposes of using TCP/IP, a respective random IP number is used for each respective one of the machines. The idea here is that the IP address and standard TCP/IP settings have not been pre-configured by the user. In addition to this IP address, a unique id (UID) is generated—this could be a random number of sufficient complexity so that a collision is statistically improbable (a working example of this is Microsoft's Global Unique Identifier (GUID). The IP address is used to allow TCP/IP to identify each PC and the UID is used to ensure that the randomly generated IPs are not the same. This is established since the same IP address must necessarily be connected to the same UID.

In the java system, a runtime executable is started that spawns off three objects: a broadcaster, a broadcast listener, and a port listener—each as a java thread. In this case, the broadcast listener could use a java multicast socket to subscribe to a multicast. Likewise, the broadcaster could also use a java muilticast socket to send information to a multicast group. The port listener could be implemented as a java sever socket.

If the broadcast listener receives a message and the IP address is the same as its own IP address and the UID is not the same, it brings down each of its proxy servers, randomly generates a new IP address, and automatically reconfigures itself. In this way, the IP addresses of each machine are eventually ensured to be unique.

If the broadcast listener receives a message and the IP address is the same as its own IP address and the UID is the same, then the message is ignored since the message was generated by its own broadcaster.

If the broadcast listener receives a message and the IP address is different and this IP address has not been encountered before, then a new java thread is generated: a proxy client which connects to the port listener on the other machine. The broadcast message contains port and IP address for the proxy client to connect as a java socket. Upon receiving this request, the port listener through the java accept method spawns a new java thread to handle this request: a proxy server. Resource information flows from the proxy server to the proxy client back to the registry.

For purposes of this java example, the registry can be organized as a hash table, where each resource is identifiable by a unique address generated when the resource or service is added to the registry. When the proxy client first connects to the proxy server, the proxy server sends information about the current registry. The proxy client then adds this information to the registry local to the proxy client. For purposes of this example, the important idea is that a handle gets associated with the proxy client in the registry, so that the process or thread local to the new address is the proxy client rather than a local process or thread. When the service is used, control information is passed to the proxy client which passes this same information to the proxy server which then passes this information to the resource or service on the other machine.

In the case of the java implementation, each of these service consists of a java object that receives ByteData either from another object using the service or resource or from the proxy server. In this was, both the client application using the service and the service itself appears local on the same machine.

The important idea behind the registry used is that it associates services/resources with addresses and it takes packets of data which it transmits to the appropriate service or resource based on this address. In the case of the java implementation, this data is passed using java data input streams and data output streams.

If the connection between the two PC's breaks, the address of remote clients 142 and 140 can be removed from local registries 124 and 126, respectively. For example, a heartbeat protocol between the PC's ensures that each is kept aware of the other until the heartbeat of one of the PC's disappears. A timer expires and automatically triggers the procedure to disable the registry's entry to the relevant client.

Figure 8:
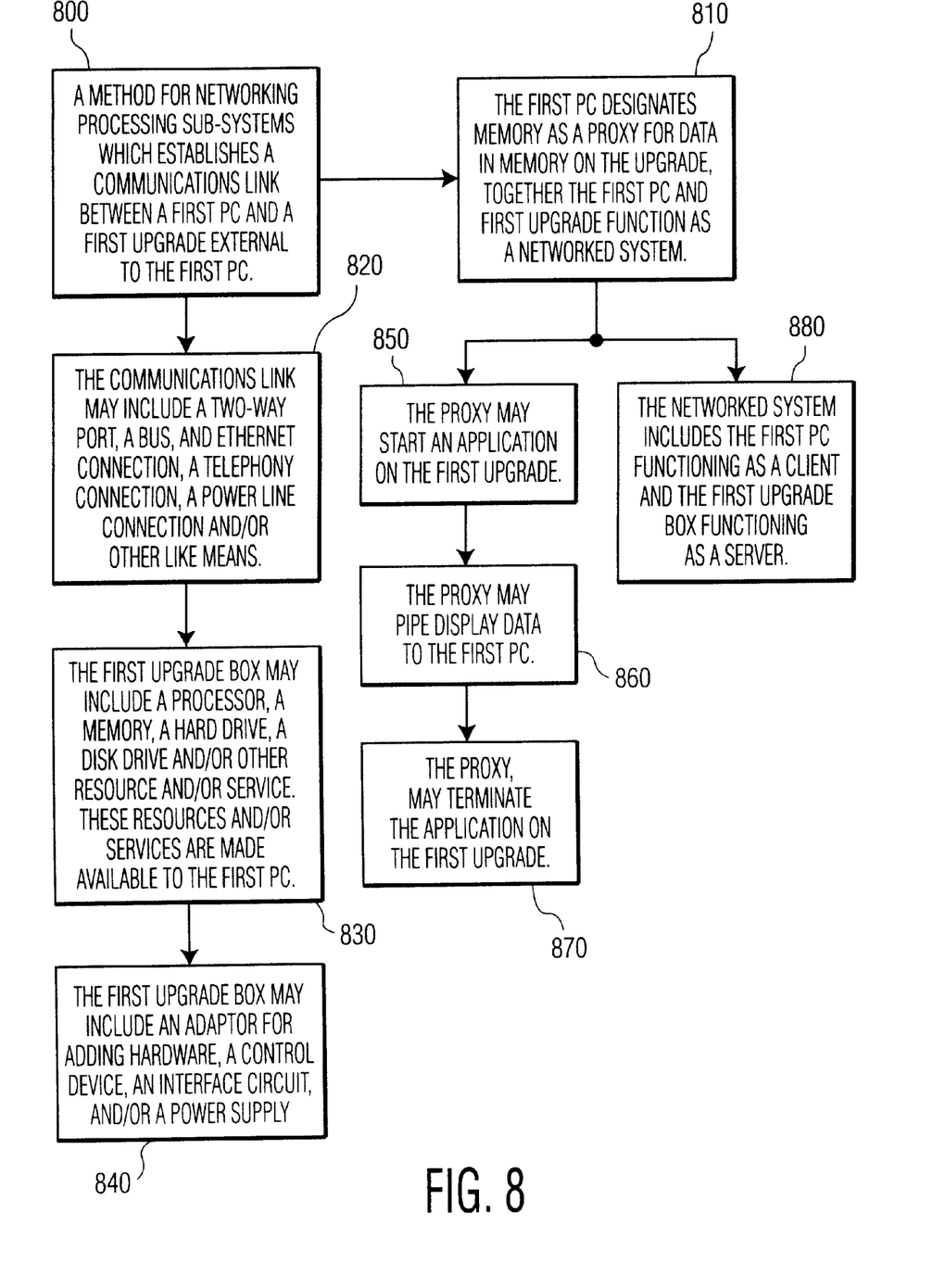
FIG. 8 is a flow chart showing the method of the present invention according to one embodiment.

An alternative embodiment of the invention is presented according to FIG. 8. In block 800, a communications link is established between a first PC and a first upgrade external to the first PC. The external upgrade may include one or more sub-systems, each sub-system including an upgrade component. The upgrade can include, for example: additional memory; a graphics card capable of splitting a video signal to multiple video monitors; storage devices such as a hard-drive, Zip® drive, writeable compact disks; a new CPU or multiple CPUs; or a new bus interface, for example, an accelerated graphics port (AGP), an universal serial bus (USB), or a 1394 high performance serial bus. Other devices may also be included. The communications link networks the processing sub-systems. There may be more then two processing sub-systems. For example, one PC may be connected to 3 upgrades offering separate additional components. These additional components may include hardware or software upgrades for PC 102 or PC 104. In block 820, the communications link may include a two-way port, a bus, an Ethernet connection, a telephony connection, a power line connection or other like means. In block 830, the first upgrade box may include a processor, a memory, a hard drive, a disk drive or other resources and/or services. These resources and/or services are made available to the first PC. In block 840, the first upgrade box may also include an adaptor for adding hardware, a control device, an interface circuit, and/or a power supply. It should be noted that the elements of FIG. 8 and FIG. 9 may include hardware, software, or a combination thereof.

In block 810, the first PC designates a portion of its memory to serve as a proxy for data in memory on the upgrade. Together the first PC and first upgrade function as a networked system. The relationship between the first PC and the first upgrade will be described in detail below in two alternative embodiments corresponding to FIG. 9 and FIG. 10. The apparatus and method described with respect to PC 102 and PC 104 may be equivalent to the first PC and first upgrade, wherein each sub-system provides a resource and/or service. To a user of the first PC, the first upgrade is invisible, all requests and returned responses appear to be saved on the first PC. In block 850, the first PC may start an application on the first upgrade. In block 860, the first upgrade may pipe data to the first PC. In block 870, the first PC may also terminate the application on the first upgrade. An example of an upgrade may include a new CPU, multiple CPUs, a hard drive, a serial bus, memory subsystem, or the like.

The trend in software development is towards software with greater functionality. The increased functionality requires greater amounts of computer resources. Over time software will require more resources than older computers can offer. This is one reason why users upgrade computers or buy new systems. A computer upgrade according to the present invention enables a user to run software on systems which originally lacked sufficient resources. The old programs continue to use the older CPU in the original computer, while the new programs use the upgrade. Therefore an upgrade builds on the existing resources and does not replace the old resources.

Another example of an upgrade according to the invention includes providing hardware, for example a 1394 serial bus, on a system that otherwise does not support such hardware. In other words, the invention provides a method whereby connections can be made between computers and upgrades that cannot be made using existing ports or sockets.

According to block 880, the networked system includes the first PC functioning as a client and the first upgrade box functioning as a server. For purposes of the present embodiment, client/server describes a relationship between two computer programs. In a network, the client/server model provides a convenient way to interconnect programs that are distributed across different locations. For illustrative purposes the first PC may be described as a client and the first upgrade as a server. The first computer may also comprise both a proxy server and proxy client. Likewise the first upgrade may comprise a proxy server and proxy client.

The features of the upgrade system of FIG. 8 are advantageous in that the system is convenient, cost of the upgrade is low compared to replacing the PC, the system needs little skill or training to use, and marginal cost versus performance gain. The invention also permits graphics cards or other equipment to be packaged as subsystems rather then as components that have to be installed by opening a computer's case. Further, according to the present invention, some upgrades, such as a hard-drive, need less time, skill, and risk of data loss then a replacement system. For example, when replacing a hard-drive, data transfer from the old hard-drive to the new hard-drive may be needed before completing the upgrade.

Figure 9:
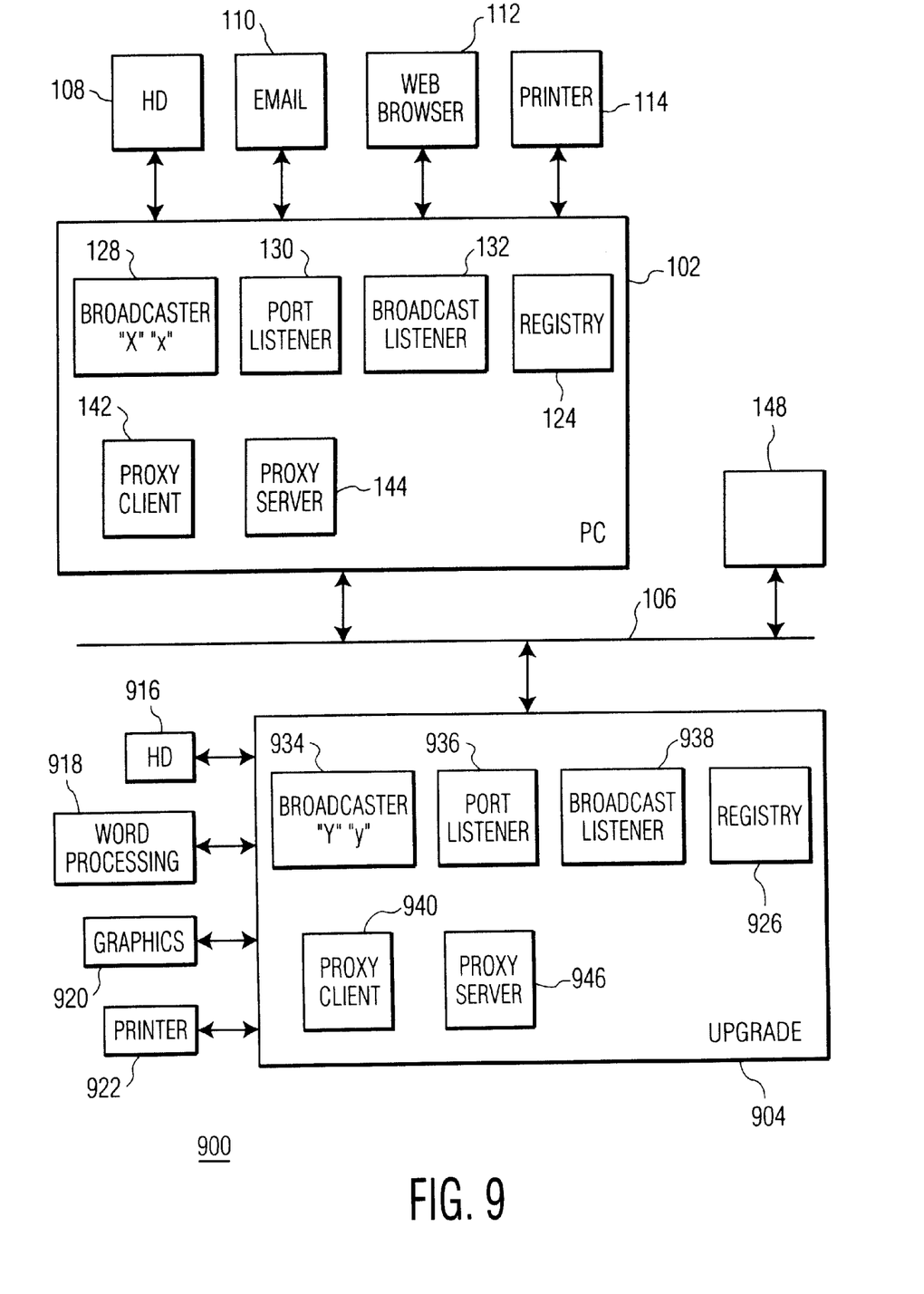
FIG. 9 is a diagram of the configuration of a second system of the invention.

FIG. 9 is a block diagram with the main components of an operational system 900 in the invention. System 900 comprises a PC 102 and a upgrade 904 coupled via a bus 106. Bus 106 may be a wired bus or a wireless bus or a combination thereof. PC 102 has resources and provides services. For example, PC 102 has a hard drive 108, an email capacity 110, a web browser 112, a printer 114, etc. Similarly, upgrade 904 has resources and services, such as a hard drive 916, a word processing service 918, a graphics program 920, a printer 922, etc. The terms "resource" and "service" are used interchangeably below. PC 102 has a registry 124 for registering interfaces to resources and services 108–114 local to PC 102. Applications running on PC 102 can get access to these interfaces. The interfaces handle the messages or requests to local resources or services 108–114. Similarly, upgrade 904 has a registry 926 for registering interfaces to resources and services 916–922 local to upgrade 904.

PC 102 may further include the following entities that are concurrent and may be threads for processes: a broadcaster 128, a port listener 130 and a broadcast listener 132. Similarly, upgrade 904 has a broadcaster 934, a port listener 936, and a broadcast listener 938. PC 102 further comprises a proxy client 142 and a proxy server 144. Upgrade 904 has a proxy client 940 and a proxy server 946. Proxy client 142 communicates with proxy server 946, and proxy client 940 communicates with proxy server 144. The roles played by components 124–144 and 926–946 in the autoconfiguration of system 900, and the roles of proxy servers 946 and 144 and proxy clients 142 and 940 are explained with reference to FIGS. 2–7, wherein the roles of the elements in the upgrade 904 function in the same manner as those of PC 104.

Figure 10:
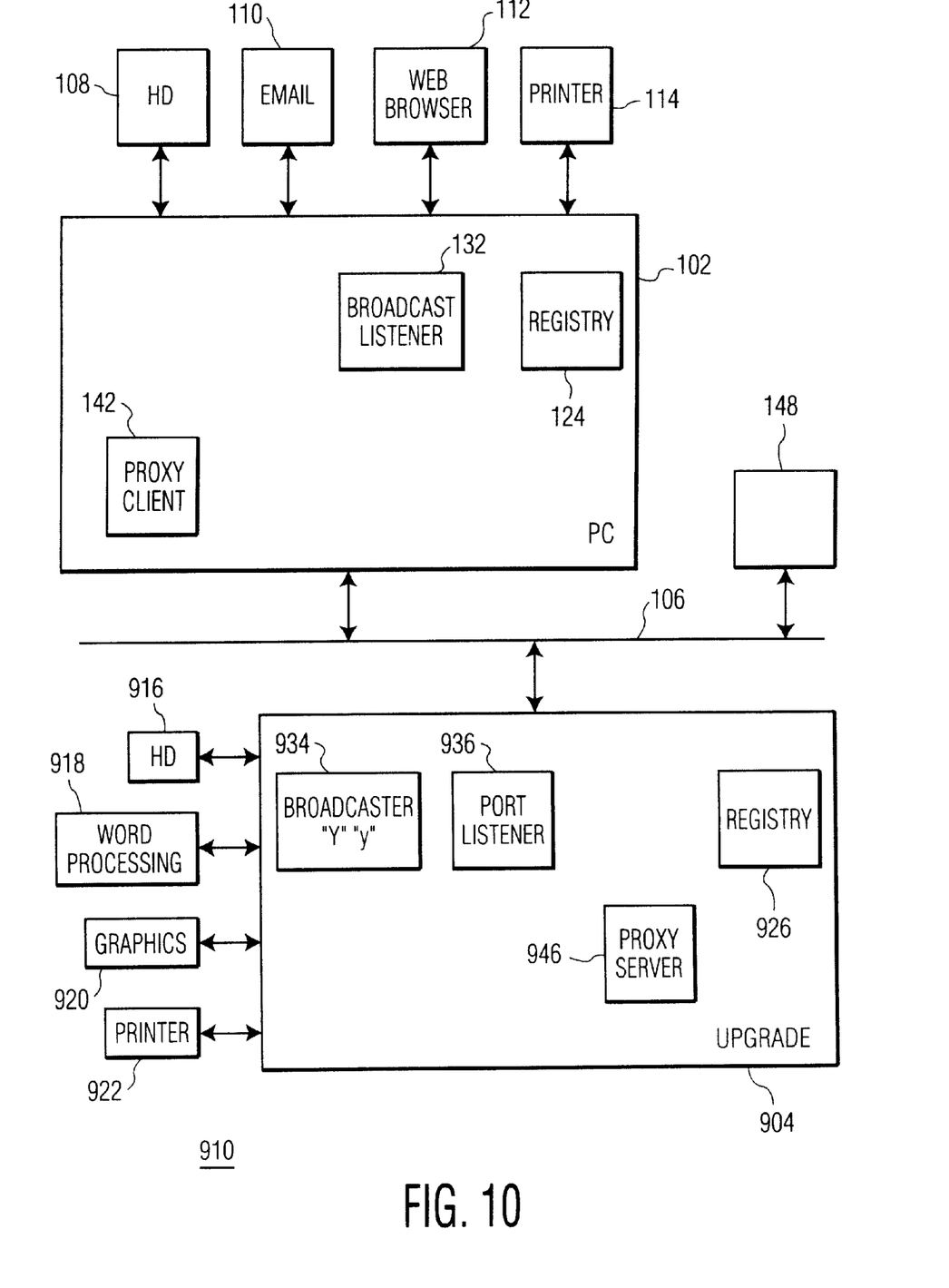
FIG. 10 is a diagram of a functional unit of the second system of the invention.

FIG. 10 is a block diagram with the main components of an operational system 900 in the invention. System 910 comprises a PC 102 and a upgrade 904 coupled via a bus 106. Bus 106 may be a wired bus or a wireless bus or a combination thereof PC 102 has resources and provides services. For example, PC 102 has a hard drive 108, an email capacity 110, a web browser 112, a printer 114, etc. Similarly, upgrade 904 has resources and services, such as a hard drive 916, a word processing service 918, a graphics program 920, a printer 922, etc. The terms "resource" and "service" are used interchangeably below.

PC 102 has a registry 124 for registering interfaces to resources and services 108–114 local to PC 102. Applications running on PC 102 can get access to these interfaces. The interfaces handle the messages or requests to local resources or services 108–114. Similarly, upgrade 904 has a registry 926 for registering interfaces to resources and services 916–922 local to upgrade 904.

PC 102 further comprises the following entities that are concurrent and may be threads for processes: a broadcast listener 132. Similarly, upgrade 904 has a broadcaster 934, and a port listener 936. PC 102 further comprises a proxy client 142. Upgrade 904 has a proxy server 946. Proxy client 142 communicates with proxy server 946.

In the initial configuration of system 910 when PC 102 and upgrade 904 have been functionally connected to bus 106. In this configuration, broadcaster 134 sends out a broadcast on bus 106 with a network address for upgrade 904, "Y," and a port number "y" on another established channel. Broadcast listener 132 of PC 102 receives the message broadcasted by upgrade 904.

In the next step of the autoconfiguration process, having received the broadcast message from PC 104, broadcast listener 132 of PC 102 generates a proxy client 142. Proxy client 142 thereupon establishes a connection with port listener 936 of upgrade 904 at port "y."

In a further step in the autoconfiguration process, port listener 936 starts up a proxy server 946 to handle requests from remote client 142. Proxy server 946 sends information about resources 916–922 to proxy client 142, which thereupon registers this with registry 124.

The step wherein proxy client 142 registers with registry 124 as a local service for each resource or service available in registry 124. The result is that upgrade 904 has copied its registry 926 to PC 102 where it gets added to registry 124. Upgrade 904 has now been registered with PC 102. When a third PC 148 is connected to bus 106, a process similar to the one discussed above occurs automatically. Registries 124 and 926 thus hide whether a resource or a service is local or is residing at another apparatus. Each of the addresses in registry 124 is unique throughout registry 124. Similarly, each of the addresses in registry 926 is unique throughout registry 926. A user working at PC 102 and requesting a local resource or service, i.e., one of resources or services 108–114 has the request passed on directly to the resource or service requested indicated by the corresponding address in registry 124. When the user requests a remote service or remote resource, e.g., one of resources or services 916–922 that is local to remote upgrade 904, the request is forwarded to proxy client 142 and processed by proxy server 946 as discussed above with respect to PC 102 and PC 104.

Having described embodiments of an apparatus and method of networking processor sub-systems, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set for in the appended claims.

What is claimed is:

1. An information processing system having a personal computer (PC) coupled to an upgrade, wherein:
   the PC comprises:
      a first proxy client registered with a first registry; and
   the upgrade comprises:
      a second registry for registering a second resource local to the upgrade; and
      a second proxy server for communicating with the first proxy client and for accessing the second resource to provide an upgrade to components of the PC.

2. The system of claim 1, wherein the PC further comprises a broadcast listener for receiving messages sent by a second broadcaster and for creating the first proxy client, the first proxy client establishes a connection with a second port listener on the upgrade on a second established channel.

3. The system of claim 1, wherein the upgrade further comprises:
   a second broadcaster for communicating a network address for the upgrade and a port number on a second established channel; and
   a second port listener for creating the second proxy server.

4. The system of claim 1, wherein:
   the PC further comprises:
      the first registry for registering a first resource local to the PC;
      a first proxy server for communicating with a second proxy client and accessing the first resource; and
   the upgrade further comprises:
      the second proxy client, registered with the second registry, for communicating with the first proxy server.

5. The system of claim 1, wherein the second resource is one of a software component, a hardware component and a software component embodied in a hardware component.

6. The system of claim 4, wherein the PC further comprises:
   a broadcast module for broadcasting a message; and
   a broadcast listener for receiving a response from the upgrade issued upon receipt of the message, and for creating the first proxy client to access the second resource local to the upgrade.

7. The system of claim 6, wherein the PC further comprises a port listener for, in response to receiving a further message from the upgrade, creating a first proxy server for enabling the upgrade to access a first resource local to the PC.

8. The system of claim 4, wherein the upgrade further comprises:
   a broadcast module for broadcasting a message; and
   a broadcast listener for receiving a response from the PC issues upon receipt of the message, and for creating a second proxy client to access a first resource local to the PC.

9. The system of claim 8, wherein the upgrade further comprises a port listener for, in response to receiving a further message from the PC, creating the second proxy server for enabling the PC to access the second resource local to the upgrade.

10. The system of claim 1, wherein the upgrade is external to the PC.

11. A method for modifying a PC comprising the steps of:
providing an upgrade capable of broadcasting a message with an internal protocol (IP) address and a port number representing the upgrade;
creating a proxy client on the PC to set up, in response to the message, communications with a port of the upgrade indicated by the port number;
creating a proxy server on the upgrade, to handle a request from the proxy client for access to a second resource; and
registering a second interface to the second resource, with the PC, for access to the second resource from the PC.

12. The method of claim 11, further comprising:
providing the PC capable of broadcasting a further message with a further IP address and a further port number representing the PC;
creating a further proxy client on the upgrade to set up, in response to the further message, communications with a further port of the PC indicated by the further port number;
creating a second proxy server on the PC, to handle a second request from the second proxy client for access to a first resource; and
registering a first interface to the first resource, with the upgrade, for access to the first resource from the upgrade.

13. The method of claim 11, wherein the upgrade is external to the PC.

14. The method of claim 11, wherein the second resource is one of a software component, a hardware component and a software component embodied in a hardware component.

15. A method for enabling a personal computer (PC) to address a resource registered with an upgrade, comprising the steps of:
creating a first proxy client at the PC for communication with the upgrade, the first proxy client being representative of the resource registered with the upgrade;
registering the first proxy client as a first local resource with a registry of the PC; and
creating a second proxy server at the upgrade for handling a request from the first proxy client.

16. The method of claim 15, wherein the upgrade is enabled to address a resource registered with the PC, comprising the steps of:
creating a second proxy client at the upgrade for communication with the PC, the second proxy client being representative of the resource registered with the PC;
registering the second proxy client as a second local resource with a registry of the upgrade; and
creating a first proxy server at the PC for handling a request from the second proxy client.

17. The method of claim 15, wherein the upgrade is external to the PC.

18. The method of claim 15, wherein the second resource is one of a software component, a hardware component and a software component embodied in a hardware component.

* * * * *